United States Patent
Maeda et al.

(10) Patent No.: US 9,170,732 B2
(45) Date of Patent: Oct. 27, 2015

(54) INFORMATION INPUT DEVICE, INFORMATION INPUT METHOD, AND INFORMATION INPUT PROGRAM

(75) Inventors: Atsuhiko Maeda, Tokyo (JP); Hiroshi Chigira, Tokyo (JP); Minoru Kobayashi, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 319 days.

(21) Appl. No.: 13/583,329

(22) PCT Filed: Mar. 18, 2011

(86) PCT No.: PCT/JP2011/056591
§ 371 (c)(1),
(2), (4) Date: Sep. 7, 2012

(87) PCT Pub. No.: WO2011/115260
PCT Pub. Date: Sep. 22, 2011

(65) Prior Publication Data
US 2013/0038555 A1    Feb. 14, 2013

(30) Foreign Application Priority Data
Mar. 18, 2010 (JP) ................ 2010-063230

(51) Int. Cl.
*G06F 3/0482* (2013.01)
*G06F 3/0488* (2013.01)
*G06F 3/0484* (2013.01)

(52) U.S. Cl.
CPC ........ *G06F 3/04883* (2013.01); *G06F 3/04842* (2013.01); *G06F 2203/04808* (2013.01)

(58) Field of Classification Search
CPC ...................................... G06F 3/017
USPC ........................................ 715/863
See application file for complete search history.

(56) References Cited

U.S. PATENT DOCUMENTS 6,094,197 A * 7/2000 Buxton et al. ............... 715/863
7,786,995 B2 * 8/2010 Abe et al. .................... 345/469

FOREIGN PATENT DOCUMENTS

| JP | 7-200126 A | 8/1995 |
| JP | 2008-052590 A | 3/2008 |
| JP | 2008-217228 A | 9/2008 |

OTHER PUBLICATIONS

International Search Report and Written Opinion, PCT International Application No. PCT/JP2011/056591, mailed May 24, 2011.
Wigdor et al., LucidTouch: A See-Through Mobile Device, UIST'07, Oct. 7-10, 2007, Newport, Rhode Island, USA, pp. 269-278.

* cited by examiner

*Primary Examiner* — Jennifer To
*Assistant Examiner* — Terri Filosi
(74) *Attorney, Agent, or Firm* — Kilpatrick Townsend & Stockton LLP

(57) ABSTRACT

An information input device includes a display, an input unit, an input direction determining unit, a tag arranging unit and a movable direction determining unit. The movable direction determining unit specifies, based on a first operation position on an input area of the input unit, a division part including the first operation position from among plural division parts on the input area. The tag arranging unit displays a tag indicating a slide operation pattern of an operator associated with the specified division part in the vicinity of a selection operation object or on the selection operation object on a display area of the display. The input direction determining unit detects, based on a second operation position on the input area, a slide operation pattern of the operator, and determines whether or not the detected slide operation pattern matches the slide operation pattern indicated by the tag within a certain range.

32 Claims, 11 Drawing Sheets

FIG. 3

<EXAMPLE OF STORAGE INFORMATION IN TAG CANDIDATE STORAGE 16>

| MOVABLE DIRECTION DETERMINATION PART | D1 | D2 | D3 | D4 |
|---|---|---|---|---|
| TAG CANDIDATE | ↓<br>→<br>↓→<br>↓↑<br>⋮ | ↓<br>←<br>↓↑<br>↓←<br>←↓<br>←→<br>↓↑↓<br>↓←→<br>←↓→<br>←→↓<br>⋮ | ↑<br>→<br>↑→<br>↑↓<br>⋮ | ↑<br>←<br>↑←<br>↑↓<br>⋮ |

FIG. 4

<EXAMPLE OF STORAGE INFORMATION IN MAP STORAGE 14>

| TAG | POINTER OF BUTTON/HYPERLINK (MEMORY ADDRESS) |
|---|---|
| ↓ | 0x0000A000 |
| ← | 0x0000AFF0 |
| ↓↑ | 0x0000AF31 |
| ↓← | 0x0000AEA0 |
| ←↓ | 0x0000ABC2 |
| ←→ | 0x0000A324 |
| ↓↑↓ | 0x0000A888 |
| ↓←→ | 0x0000ABBB |
| ←↓← | 0x0000A998 |
| ←→↓ | 0x0000AEBA |
| ⋮ | ⋮ |

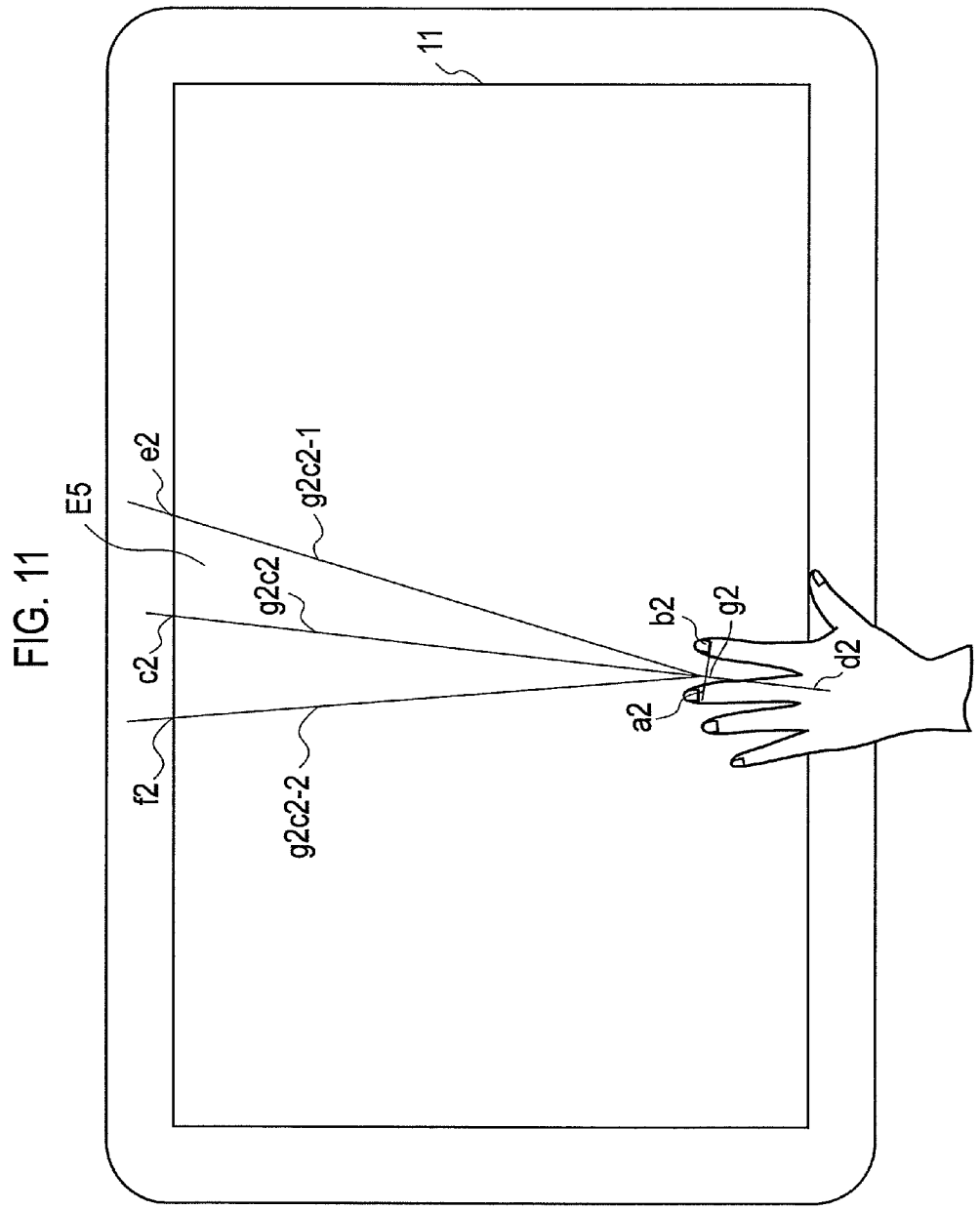

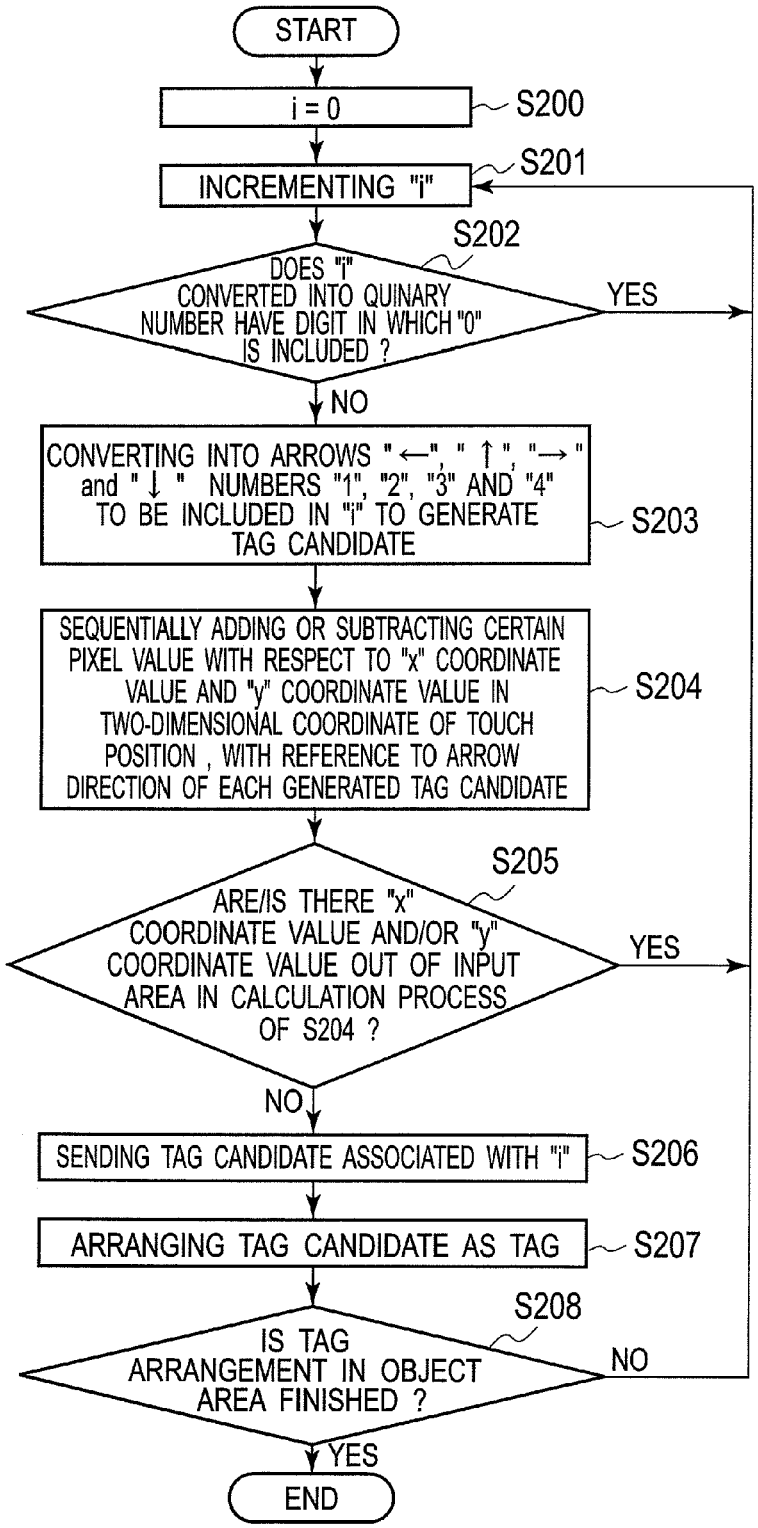

INFORMATION INPUT DEVICE, INFORMATION INPUT METHOD, AND INFORMATION INPUT PROGRAM

This application is a national stage application of PCT/JP2011/056591, which claims priority to JP 2010-063230, filed Mar. 18, 2010, both of which are incorporated herein by reference.

TECHNICAL FIELD

The present invention relates to an information input device, an information input method and an information input program to be used by a portable terminal such as a mobile phone, a PDA (Personal Digital Assistant), an electronic organizer or a music player, or a fixed terminal such as a table top display.

BACKGROUND ART

Recently, among a portable terminal such as a mobile phone or a PDA, a television receiver and a gaming device in addition to a personal computer, a terminal with a browser function capable of browsing a website on Internet becomes widely used. When browsing a website, a user views desired information by receiving webpage information and displaying it on the terminal using the browser function, and then carrying out a selection operation with respect to menus, buttons, hyperlinks and the like displayed on a screen of the webpage (for example, see Patent Literature 1).

As represented by a mobile phone called a smartphone, a portable terminal with an information input device called a touch panel has been widely used. For the portable terminal with the touch panel in which a pressure-sensitive sheet is laminated and arranged on a display panel including a liquid crystal or organic EL for example, in a state where a button, a hyperlink and the like are displayed on the display panel, when a user touches a desire display position on the pressure-sensitive sheet, a button or hyperlink corresponding to a position coordinate thereof is selected and input. In comparison with the use of a keypad, the use of this type of portable terminal allows various input operations.

However, when browsing a website using a portable terminal with such a small-size touch panel, there is a possibility that the following inconvenience occurs. Namely, plural pieces of information of selection operation objects such as menus, buttons and hyperlinks are generally displayed on a screen of a webpage. Because of this, display sizes of respective menus, buttons and hyperlinks are limited, and when they are selected in a small-size touch panel, respective buttons and the like are hidden by a user's finger tip. This makes a proper touch difficult. As pointed out in Non Patent Literature 1 for example, this problem is an important one to be solved, in order to keep good operability of a terminal with a small-size touch panel.

On the other hand, as represented by a table top display, a fixed terminal with an information input device called a touch panel has been widely used. When browsing a website using a fixed terminal such a large-size touch panel, there is a possibility that the following inconvenience occurs. Namely, when plural pieces of information of selection operation objects such as menus, buttons and hyperlinks are displayed on a screen of a webpage, respective menus, buttons and hyperlinks are not necessarily displayed within the reach of a user's finger. Because of this, there is a possibility that a user can not touch a desired menu, button or hyperlink in a large-size touch panel. This problem is an important one to be solved, in order to keep good operability of a terminal with a large-size touch panel.

CITATION LIST

Patent Literature

[PTL 1]
Japanese Patent Application Laid-Open Publication No. 2008-217228

Non Patent Literature

[NPL 1]
LucidTouch: A See-Through Mobile Device, Daniel Wigdor, Clifton Forlines, Patrick Baudisch, John Barnwell, Chia Shen, UIST' 07, Oct. 7-10, 2007, Newport, R.I., USA. P. 269 "INTRODUCTION AND MOTIVATION" second paragraph

SUMMARY OF INVENTION

Technical Problem

As described above, when carrying out an operation for browsing a webpage using a terminal with a small-size touch panel, plural pieces of information of selection operation objects such as respective buttons, hyperlinks and the like are hidden by a user's finger tip. This makes a proper selection operation difficult. A portable terminal with a small-size display panel such as a smartphone, a PDA, an electronic organizer or a music player has this inevitable problem. In addition, when carrying out an operation for browsing a webpage using a terminal with a large-size touch panel, plural pieces of information of selection operation objects such as respective buttons, hyperlinks and the like are not necessarily displayed within the reach of a user's finger. This makes a proper selection operation difficult. A fixed terminal with a large-size display panel such as a table top display has this inevitable problem.

The present invention is made in view of the above problems, and it is an object of the present invention to provide an information input device, an information input method and an information input program that allow a selection operation object to be easily and properly selected without depending on a display size of the selection operation object displayed on a display panel so as to improve operability.

Solution to Problem

In order to resolve the above-described problem, the present invention provides an information input device comprising: a display panel that has a display area where a selection operation object is to be displayed; a touch panel that has an input area corresponding to the display area; a tag display unit configured to specify, based on a first operation position on the input area where a tag display designation operation by an operator is carried out, a division part including the first operation position from among plural division parts on the input area, and display a tag indicating a slide operation pattern of the operator associated with the specified division part in the vicinity of the selection operation object or on the selection operation object; a determining unit configured to detect, based on a second operation position on the input area where a slide operation by the operator is carried out, a slide operation pattern of the operator, and determine whether or not the detected slide operation pattern matches the slide operation pattern indicated by the tag within a certain range; and an identifying unit configured to identify, when the detected slide operation pattern matches the slide operation pattern indicated by the tag within the certain range, that the selection operation object associated with the tag is selected.

In order to resolve the above-described problem, the present invention provides an information input method comprising: specifying, based on a first operation position on an input area of a touch panel where a tag display designation operation by an operator is carried out, a division part including the first operation position from among plural division parts on the input area; displaying a tag indicating a slide operation pattern of the operator associated with the specified division part in the vicinity of a selection operation object displayed on a display area of a display panel or on the selection operation object; detecting, based on a second operation position on the input area where a slide operation by the operator is carried out, a slide operation pattern of the operator; determining whether or not the detected slide operation pattern matches the slide operation pattern indicated by the tag within a certain range; and identifying, when the detected slide operation pattern matches the slide operation pattern indicated by the tag within the certain range, that the selection operation object associated with the tag is selected.

In order to resolve the above-described problem, the present invention provides an information input device comprising: a display panel that has a display area where a selection operation object is to be displayed; a touch panel that has an input area corresponding to the display area; a setting unit configured to set on the display area, based on any one of a fourth operation position, plural operation positions, a contact area by the operator, and two operation positions by the operator on the input area where an object area designation operation by the operator is carried out, an object area including the selection operation object; a tag display unit configured to display a tag indicating a slide operation pattern of the operator in the vicinity of the selection operation object or on the selection operation object; a determining unit configured to detect, based on a fifth operation position on the input area where a slide operation by the operator is carried out, a slide operation pattern of the operator, and determine whether or not the detected slide operation pattern matches the slide operation pattern indicated by the tag within a certain range; and an identifying unit configured to identify, when the detected slide operation pattern matches the slide operation pattern indicated by the tag within the certain range, that the selection operation object associated with the tag is selected.

In order to resolve the above-described problem, the present invention provides an information input program comprising: a first information input program code for causing a computer to specify, based on a first operation position on an input area of a touch panel where a tag display designation operation by an operator is carried out, a division part including the first operation position from among plural division parts on the input area; a second information input program code for causing the computer to display a tag indicating a slide operation pattern of the operator associated with the specified division part in the vicinity of a selection operation object displayed on a display area of a display panel or on the selection operation object; a third information input program code for causing the computer to detect, based on a second operation position on the input area where a slide operation by the operator is carried out, a slide operation pattern of the operator; a fourth information input program code for causing the computer to determine whether or not the detected slide operation pattern matches the slide operation pattern indicated by the tag within a certain range; and a fifth information input program code for causing the computer to identify, when the detected slide operation pattern matches the slide operation pattern indicated by the tag within the certain range, that the selection operation object associated with the tag is selected.

In order to resolve the above-described problem, the present invention provides an information input method comprising: setting on a display area of a display panel, based on any one of a fourth operation position, plural operation positions, a contact area by an operator, and two operation positions by the operator on an input area of a touch panel where an object area designation operation by the operator is carried out, an object area including a selection operation object displayed on the display area; displaying a tag indicating a slide operation pattern of the operator in the vicinity of the selection operation object or on the selection operation object; detecting, based on a fifth operation position on the input area where a slide operation by the operator is carried out, a slide operation pattern of the operator; determining whether or not the detected slide operation pattern matches the slide operation pattern indicated by the tag within a certain range; and identifying, when the detected slide operation pattern matches the slide operation pattern indicated by the tag within the certain range, that the selection operation object associated with the tag is selected.

Advantageous Effects of Invention

According to the present invention, when a user selects a desired selection operation object, it is possible to select the selection operation object by carrying out a slide operation by an operator with reference to a slide operation pattern indicated by a displayed tag associated with the selection operation object. Therefore, even when a selection operation object is hidden by an operator due to a small display size of the selection operation object, a user can easily and surely carry out a selection designation for the selection operation object without directly touching a display position of the selection operation object. Also, since it is not necessary to directly touch a display position of a selection operation object, even when a selection operation object displayed using a terminal with a large size display area in a position which a user's finger is hard to reach is selected, the user can carry out a selection designation for the selection operation object in a natural manner without forcibly bending or extending the user's finger or shifting the terminal to the other hand. This increases operability.

According to the present invention, depending on an operation position of a user on an input area, it is possible to provide a proper slide operation pattern to the user using a tag. Thereby, the user can carry out a slide operation of an operator in a natural attitude without taking an unnatural operation attitude.

According to the present invention, since a slide operation pattern is detected by determining which parts a slide operation passes among plural division parts, it is possible to easily and surely detect a slide operation pattern without carrying out a complicated process such as a vector analysis for operation position coordinates If the display number of tags increases too much, it is concerned that visibility of display information deteriorates, and operability deteriorates due to increase of the number of operations at a time when a selection operation object is selected. However, according to the present invention, since an object area where a tag is to be arranged is set and the number of tags to be simultaneously displayed on a display panel is limited, it is possible to maintain good visibility and operability of the display information.

Thus, according to the present invention, it is possible to easily and surely select a selection operation object without depending on a display size of the selection operation object to be displayed on a display panel. Thereby, the information input device, the information input method and the information input program capable of increasing operability can be provided.

It is a block diagram that illustrates a configuration of main elements of a portable terminal with an information input device according to an exemplary embodiment of the present invention.

FIG. 2

Figure 1:
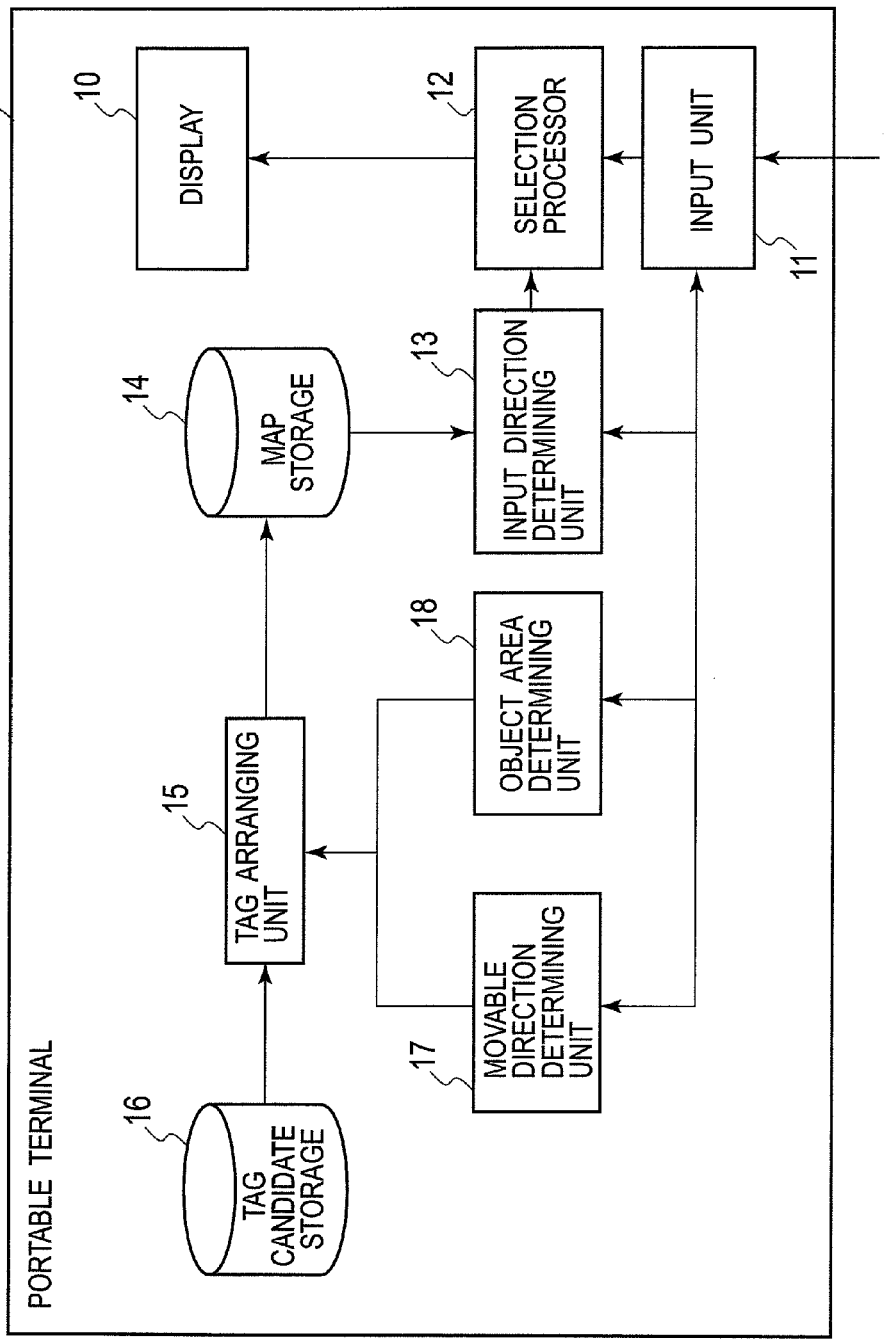
FIG. 1

It is a flowchart that illustrates proceedings and contents of an input reception process in the portable terminal shown in FIG. 1.

FIG. 3

It is a diagram that illustrates one example of information stored in a tag candidate storage of the portable terminal shown in FIG. 1.

FIG. 4

It is a diagram that illustrates one example of information stored in a map storage of the portable terminal shown in FIG. 1.

FIG. 5

It is a diagram to be used to illustrate operations of the portable terminal shown in FIG. 1.

FIG. 6

It is a diagram to be used to illustrate operations of the portable terminal shown in FIG. 1.

FIG. 7

It is a diagram to be used to illustrate operations of the portable terminal shown in FIG. 1.

FIG. 8

It is a diagram to be used to illustrate operations of the portable terminal shown in FIG. 1.

FIG. 9

It is a diagram to be used to illustrate operations of a portable terminal with an information input device according to a first modified example of the exemplary embodiment of the present invention.

FIG. 10

It is a diagram to be used to illustrate operations of a portable terminal with an information input device according to a second modified example of the exemplary embodiment of the present invention.

FIG. 11

It is a diagram to be used to illustrate operations of a portable terminal with an information input device according to a third modified example of the exemplary embodiment of the present invention.

FIG. 12

It is a diagram to be used to illustrate operations of a portable terminal with an information input device according to a fourth modified example of the exemplary embodiment of the present invention.

DESCRIPTION OF EMBODIMENTS

An exemplary embodiment according to an information input device, an information input method and an information input program of the present invention will be described below with reference to drawings. The present embodiment will be described while citing an information input device with a small-size touch panel as one example of information input device. It is noted that the present invention may be applied to an information input device with a large-size touch panel. Although the present embodiment will be described while citing a user's finger as one example of an operator for touching a touch panel, an object such as a pen may be used. Also, although the present embodiment will be described while citing a pressure-sensitive sheet as one example of a touch panel, a detector for detecting a touch position of an operator according to an operating principle such as an electromagnetic induction type or a capacitance type may be used.

Here, the following embodiment will provide one example of an information input device, an information input method and an information input program in order to embody a technical idea of the present invention, and the technical idea of the present invention does not limit an arrangement and function of each structural element to the following embodiment. The technical idea of the present invention may be variously modified within the scope of claims.

FIG. 1 is a block diagram that illustrates a configuration of main elements of a portable terminal with an information input device according to the exemplary embodiment of the present invention. A portable terminal 1 includes a display 10, an input unit 11, a selection processor 12, an input direction determining unit 13, a map storage 14, a tag arranging unit 15, a tag candidate storage 16, a movable direction determining unit 17 and an object area determining unit 18. The display 10 is made of a liquid crystal or organic EL, for example.

The input unit 11, the selection processor 12, the input direction determining unit 13, the tag arranging unit 15, the movable direction determining unit 17 and the object area determining unit 18 are realized by causing a central processing unit (CPU), which is not shown in the drawing, to execute an application program stored in a program memory.

The input unit 11 has a pressure-sensitive sheet which is laminated and arranged on the display 10 and includes an input area overlapping a display area of the display 10, and an input processor, for example. An x-axis and a y-axis are respectively set to a traverse direction and a longitudinal direction of the input area in the pressure-sensitive sheet, and the origin (0, 0) is assigned to the bottom left of the input area. Further, a direction from left to right in the input area is defined as a positive direction on the x-axis, and a direction from bottom to top in the input area is defined as a positive direction on the y-axis. As well, an x-axis and a y-axis are respectively set to a traverse direction and a longitudinal direction of the display area in the display 10, and the origin (0, 0) is assigned to the bottom left of the display area. Further, a direction from left to right in the display area is defined as a positive direction on the x-axis, and a direction from bottom to top in the display area is defined as a positive direction on the y-axis. A coordinate value of an arbitrary position of the input area in the pressure-sensitive sheet matches a coordinate value of a position of the display area in the display 10 corresponding to the arbitrary position. It is noted that a coordinate value of an arbitrary position of the input area in the pressure-sensitive sheet may be subject to a certain conversion, in order to match a coordinate value of a position of the display area in the display 10 corresponding to the arbitrary position. For example, in a case where a size of the display area in the display 10 differs from a size of the input area in the pressure-sensitive sheet, or where information input in the input unit 11 of a remote controller through an infrared ray or a wireless is transmitted to the display 10 of the information input device, a coordinate value of an arbitrary position of the input area in the pressure-sensitive sheet matches a coordinate value of a position of the display area in the display 10 corresponding to the arbitrary position, by a certain conversion.

The input processor has the following processing functions.

(1) a function for setting a display mode to either a normal mode or a tag display mode.

(2) a function for detecting, when a user touches an arbitrary position of the input area on the pressure-sensitive sheet at a user's finger tip, a two-dimensional coordinate of the touch position (touch position coordinate) and a touch time length based on a pressure-sensitive output from the pressure-sensitive sheet.

(3) a function for determining, when the input area on the pressure-sensitive sheet is touched, whether or not a button or hyperlink (selection operation object) is displayed at a position in the display area of the display 10 corresponding to a two-dimensional coordinate of the touch position.

(4) a function for determining, when a button or hyperlink is displayed at the position in the display area of the display 10 corresponding to the two-dimensional coordinate of the touch position based on the determination result of (3), that the touch operation is one for directly selecting the button or hyperlink, reading out a pointer of the button or hyperlink from a memory in the input unit 11 for example, and outputting it to the selection processor 12.

(5) a function for determining, when a button or hyperlink is not displayed at the position in the display area of the display 10 corresponding to the two-dimensional coordinate of the touch position based on the determination result of (3) and the touch operation is a long push based on the determination result of (2), that the touch operation is a tag display instruction operation, and sending the two-dimensional coordinate of the touch position to the movable direction determining unit 17 and the object area determining unit 18.

The movable direction determining unit 17 stores coordinate values indicative of four movable direction determination parts (division parts) D1 to D4 defined by dividing all input areas on the pressure-sensitive sheet in quarters. It is noted that the movable direction determination parts D1 to D4 may be defined on the display area of the display 10. Then, when the two-dimensional coordinate of the touch position is sent from the input unit 11, the movable direction determining unit 17 carries out processing for determining which part the two-dimensional coordinate of the touch position is included in among the movable direction determination parts D1 to D4.

The tag candidate storage 16 stores tag candidates associated with respective movable direction determination parts D1 to D4. FIG. 3 is a diagram that illustrates one example of tag candidates stored in the tag candidate storage 16. Each tag candidate is composed of one arrow or an arrow line in which plural arrows are combined, wherein each arrow is indicative of an operation direction.

The object area determining unit 18 previously stores a coordinate value of the center position of the display area in the display 10. When the two-dimensional coordinate of the touch position is sent from the input unit 11, the object area determining unit 18 determines whether a "y" coordinate value of the two-dimensional coordinate of the touch position indicates the upper part or the lower part of the display area with respect to the coordinate value of the center position. Then, the object area determining unit 18 carries out processing for setting an object area where tags are displayed, between the "y" coordinate value of the two-dimensional coordinate of the touch position and a "y" coordinate value of an end portion of a part at a side where there is not the touch position.

The tag arranging unit 15 sequentially reads out a tag candidate from the tag candidate storage 16 from among tag candidates associated with a movable direction determining part where the two-dimensional coordinate of the touch position is included, based on the determination result of the movable direction determining unit 17. Then, the tag arranging unit 15 carries out processing for associating each read tag candidate with a button or hyperlink to be displayed in the object area set by the object area determining unit 18, and arranging it in the vicinity of the button or hyperlink or on the button or hyperlink.

The map storage 14 associates one or more tags arranged in the vicinity of one or more buttons or hyperlinks or on the one or more buttons or hyperlinks, with one or more pointers of the one or more buttons or hyperlinks (memory address), and stores them. FIG. 4 is a diagram that illustrates one example of correspondence relations between the tags and the pointers stored in the map storage 14.

When each two-dimensional coordinate by a slide operation is sent from the input unit 11 in a state where a tag display mode is set, the input direction determining unit 13 compares each two-dimensional coordinate with the coordinate values indicative of the movable direction determination parts D1 to D4 stored in the movable direction determining unit 17, and determines which part a trajectory of two-dimensional coordinates by the slide operation passes among the movable direction determination parts D1 to D4. The input direction determining unit 13 determines a slide operation pattern based on the determination result. Then, the input direction determining unit 13 reads out a pointer associated with a tag corresponding to the determined slide operation pattern from the map storage 14, and carries out processing for outputting the read pointer to the selection processor 12.

The selection processor 12 recognizes a selection operation of a button or hyperlink corresponding to the pointer based on the pointer output from the input unit 11 or the input direction determining unit 13, and carries out processing for changing a display figure of the button or hyperlink displayed on the display 10 into a figure for representing a state after the selection.

Figure 2:
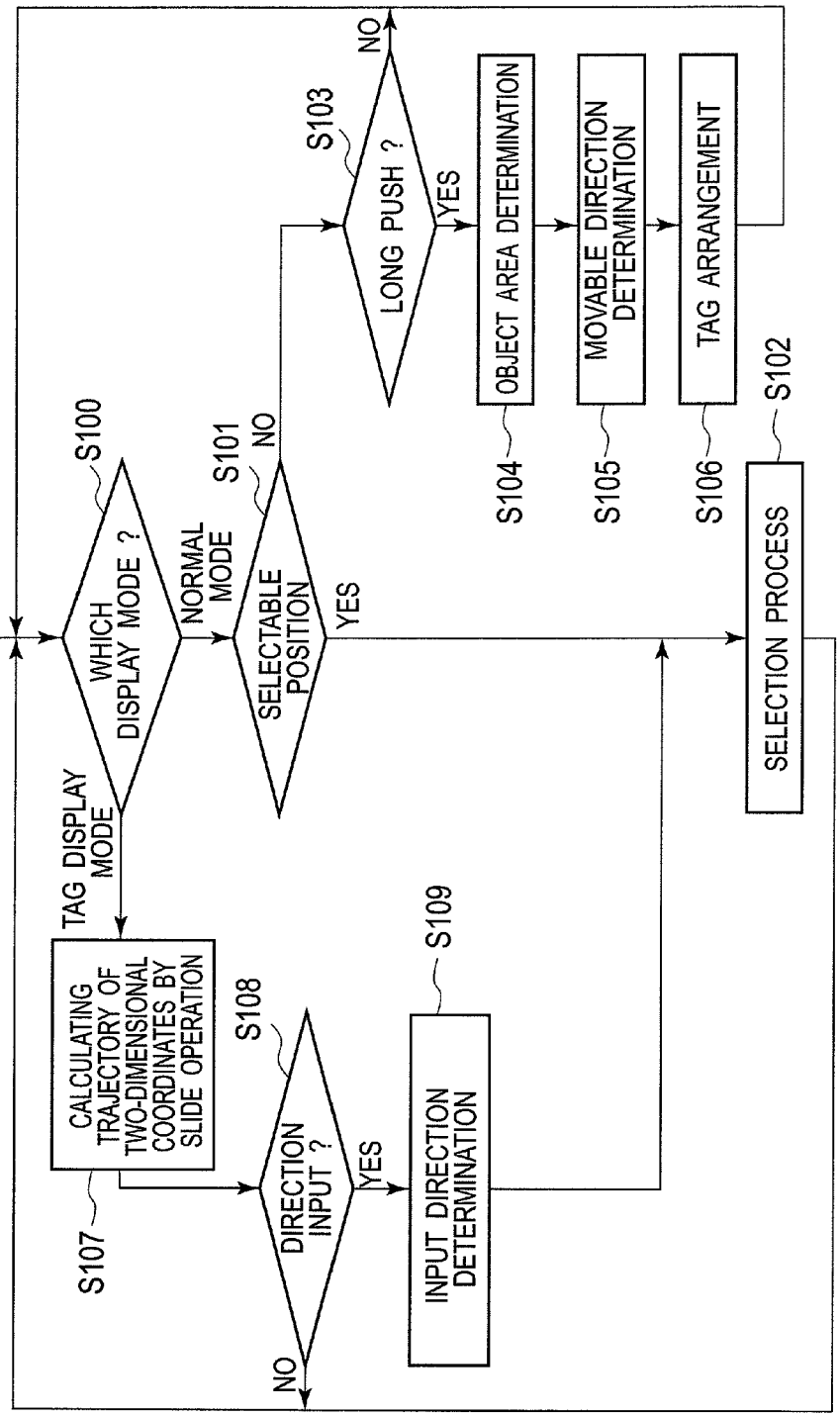

Next, an information input reception process by the portable terminal configured as describe above will be described. FIG. 2 is a flowchart that illustrates proceedings and contents of the information input reception process.

(1) An Information Input Reception Process at the Time when a Normal Mode is Set The input unit 11 monitors a touch operation by a user with respect to the pressure-sensitive sheet on the display 10. In this state, when a user touches the pressure-sensitive sheet, the input unit 11 firstly determines whether a normal mode or a tag display mode is set as the display mode in step S100. For example, the determination is carried out by referring to a flag of the display mode stored in a memory in the input unit 11.

If the normal mode is set as the display mode, the information input reception process proceeds to step S101. In step S101, the input unit 11 determines whether or not the touched position corresponds to a position where a button or hyperlink displayed on the display 10 can be selected. For example, the determination is carried out by calculating a two-dimensional coordinate on the display area of the display 10 corresponding to two-dimensional coordinate of the touched position, and determining whether or not the touched position matches a display position of a button or hyperlink in the display 10 within a certain range. If the touched position corresponds to a position where a button or hyperlink can be selected (Yes), the input unit 11 determines the button or hyperlink is directly selected, and sends a pointer of the button or hyperlink to the selection processor 12. In step S102, the selection processor 12 changes a display figure of the selected button or hyperlink into a figure for representing a state after the selection, based on the pointer.

(2) A Tag Display for a Button or Hyperlink

On the other hand, if the touched position does not correspond to a position where a button or hyperlink can be selected (No), the information input reception process proceeds to step S103. In step S103, it determines whether or not the touch operation is a long push. The long push means an operation mode of continuing to touch one portion for a previously defined time or more (e.g., 0.5 seconds or more). If the touch operation is not the long push (No), the information input reception process returns to step S100. If the touch operation is the long push (Yes), the input unit 11 changes a flag for representing the display mode stored in the memory in the input unit 11 from the normal mode to the tag display mode, and sends a two-dimensional coordinate of the touch position long pushed to the movable direction determining unit 17 and the object area determining unit 18.

Figure 5:
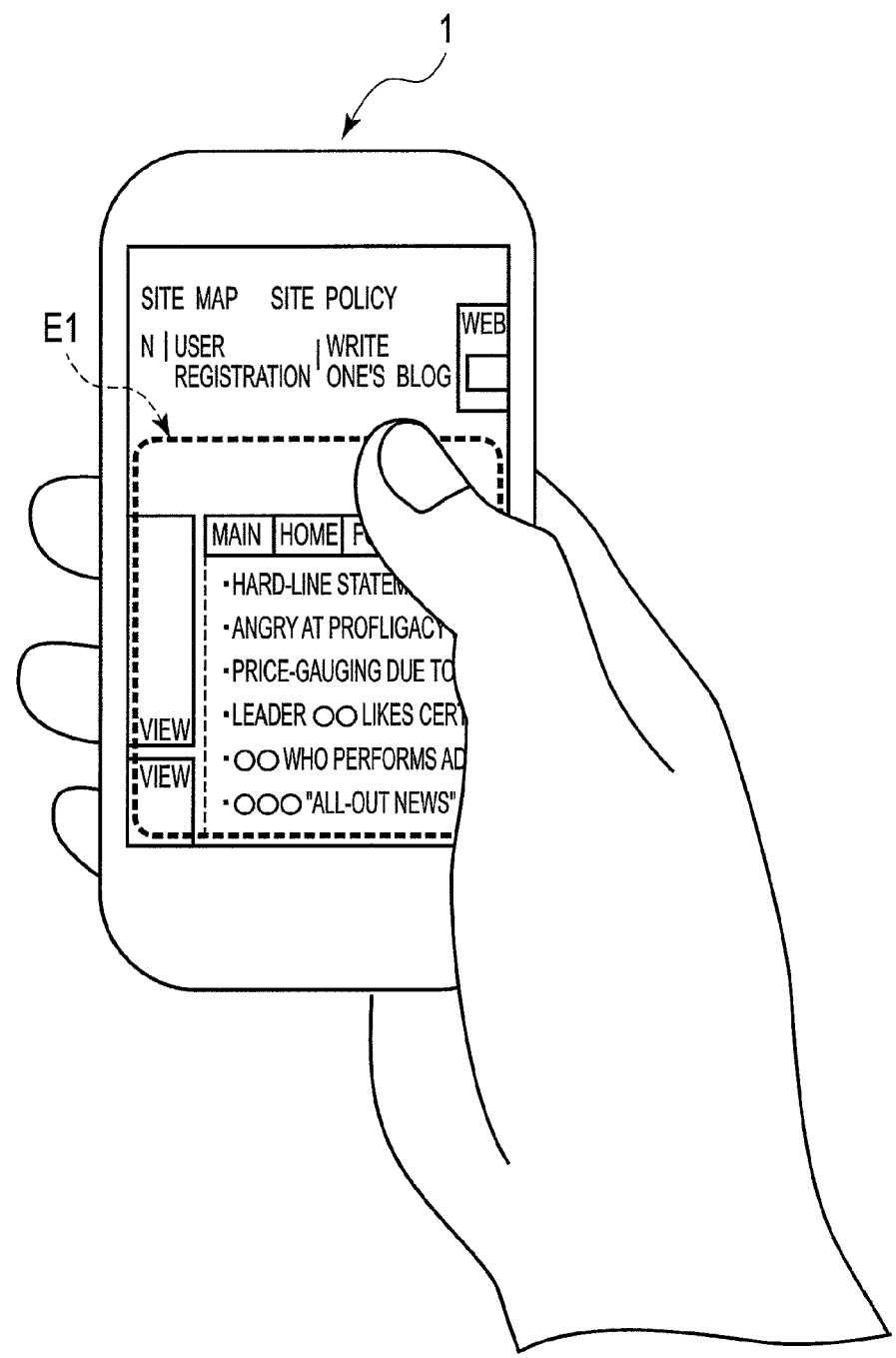

In step S104, the object area determining unit 18 determines whether the two-dimensional coordinate of the touch position is included in the upper part (the upper half of the display area) or the lower part (the lower half of the display area) with respect to a "y" coordinate value of the center coordinate of the display area in the display 10. If the two-dimensional coordinate of the touch position is included in the upper half of the display area in the display 10, the object area determining unit 18 sets a display part (rectangular area) at the lower side with respect to a "y" coordinate value of the two-dimensional coordinate of the touch position as an object area where tag candidates are displayed. FIG. 5 is a diagram that shows one example of the setting result of the object area. The reference number E1 indicates the object area set by the object area determining unit 18.

Figure 6:
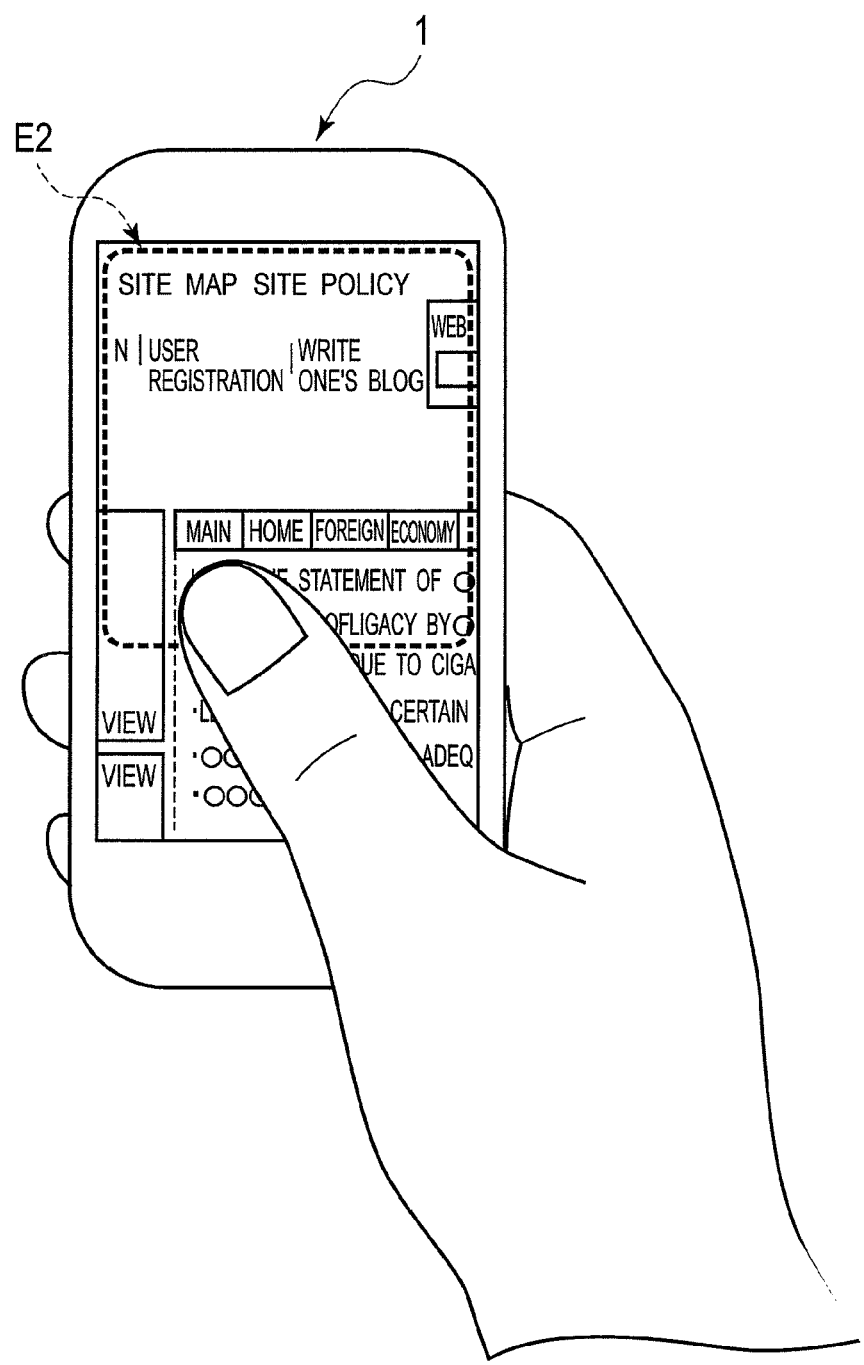

If the two-dimensional coordinate of the touch position is included in the lower half of the display area in the display 10, the object area determining unit 18 sets a display part (rectangular area) at the upper side with respect to the "y" coordinate value of the two-dimensional coordinate of the touch position as an object area where tag candidates are displayed. FIG. 6 is a diagram that shows one example of the setting result of the object area. The reference number E2 indicates the object area set by the object area determining unit 18.

In step S105, the movable direction determining unit 17 determines which part the two-dimensional coordinate of the touch position is included in among the movable direction determination parts D1 to D4 previously defined. The movable direction determining unit 17 sends information for representing the determined movable direction determination part to the tag arranging unit 15.

Figure 7:
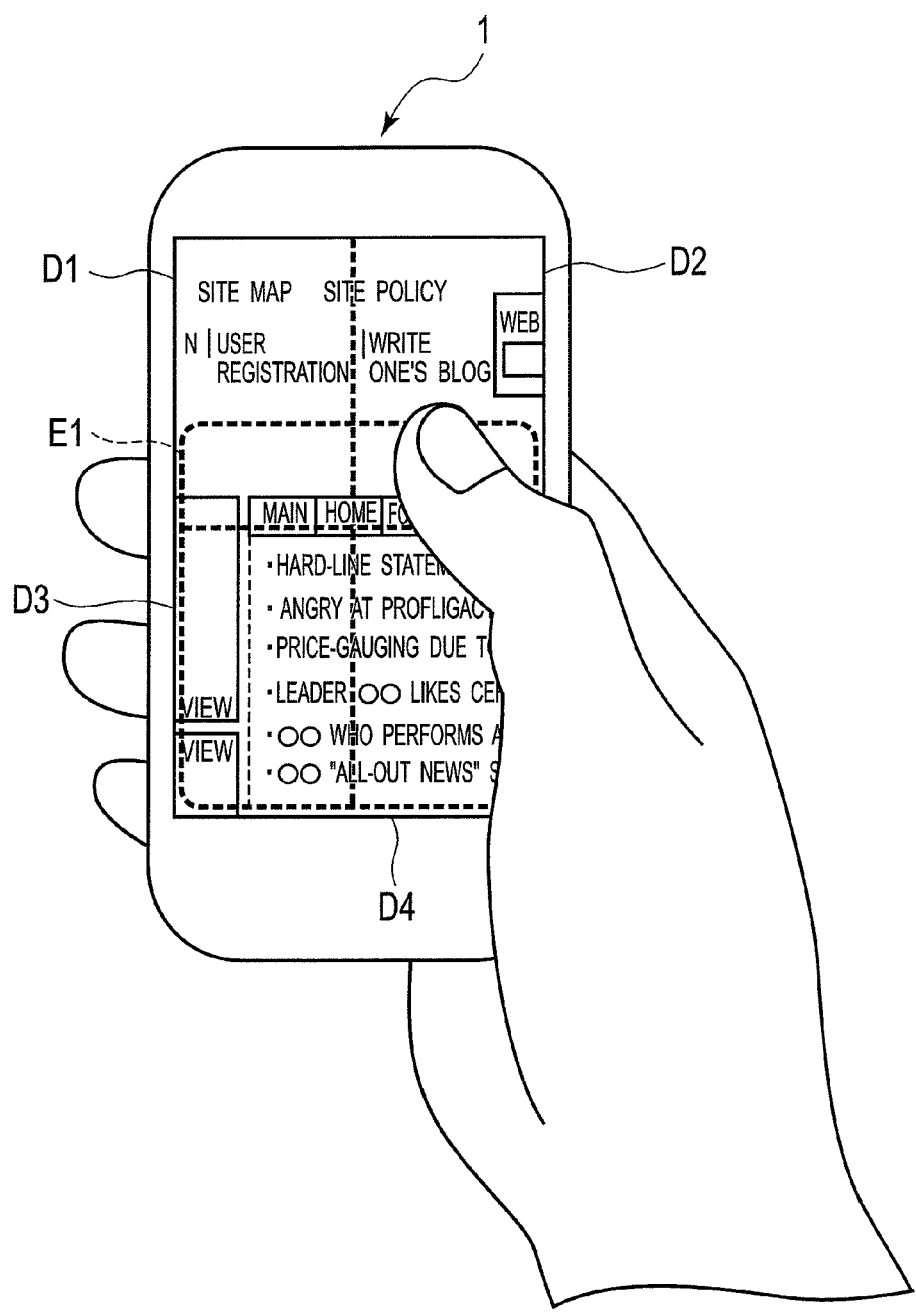

For example, as shown in FIG. 7, the input area on the pressure-sensitive sheet is previously divided into four movable direction determination parts D1 to D4 by a vertical line and a horizontal line passing the center coordinate of the input area. In this state, when a user touches an arbitrary position in the movable direction determination part D2, the movable direction determining unit 17 determines that the two-dimensional coordinate of the touch position is included in the movable direction determination part D2, and then sends information for representing the movable direction determination part D2 to the tag arranging unit 15.

Also, when a user touches an arbitrary position in the movable direction determination part D1, the movable direction determining unit 17 determines that the two-dimensional coordinate of the touch position is included in the movable direction determination part D1, and then sends information for representing the movable direction determination part D1 to the tag arranging unit 15. As well, when a user touches an arbitrary position in the movable direction determination part D3 or D4, the movable direction determining unit 17 determines that the two-dimensional coordinate of the touch position is included in the movable direction determination part D3 or D4, and then sends information for representing the movable direction determination part D3 or D4 to the tag arranging unit 15.

When the information for representing the movable direction determination part including the two-dimensional coordinate of the touch position is sent from the movable direction determining unit 17, the tag arranging unit 15 sequentially reads out a tag candidate associated with the sent movable direction determination part from the tag candidate storage 16 in step S106. Then, the tag arranging unit 15 associates each read tag candidate with a button or hyperlink to be displayed in the object area set by the object area determining unit 18.

Figure 8:
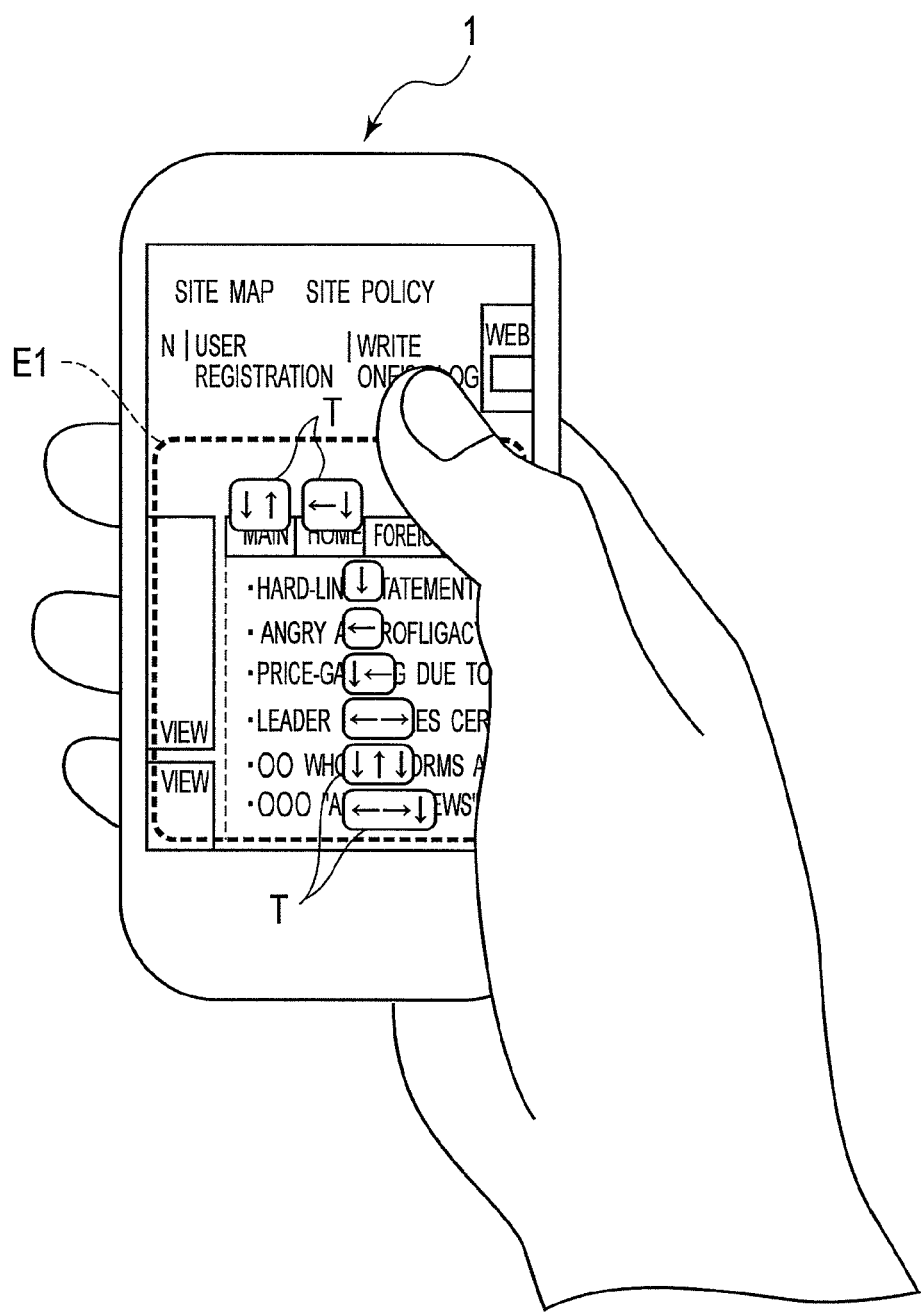

For example, as shown in FIG. 7, when a user long pushes a position where a button or hyperlink is not displayed in the movable direction determination part D2, the tag arranging unit 15 sequentially reads out a tag candidate associated with the movable direction determination part D2 from the tag candidate storage 16. Then, the tag arranging unit 15 associates each read tag candidate with a button or hyperlink to be displayed in the object area E1 set by the object area determining unit 18, and arranges, as a tag T, each candidate in the vicinity of the button or hyperlink or on the button or hyperlink. FIG. 8 is a diagram that illustrates a display example of a webpage in the display 10 after tags T are arranged to buttons or hyperlinks. Thereby, a user can visually recognize that the different tags T are associated with the buttons or hyperlinks, When the process for arranging one or more tags T in the vicinity of one or more buttons or hyperlinks or on one or more buttons or hyperlinks is finished, the tag arranging unit 15 associates the one or more tags T arranged to the one or more buttons or hyperlinks or on the one or more buttons or hyperlinks with one or more pointers (memory addresses) of the one or more buttons or hyperlinks, and they are stored in the map storage 14 (see FIG. 4).

(3) An Information Input Reception Process at the Time when a Tag Display Mode is Set In a case of carrying out an operation for selecting a desired button or hyperlink in a state where a tag display mode is set, a user slides his/her finger tip in each direction of one or more arrows indicated by a tag T associated with the button or the hyperlink displayed on the object area set in the display area in the display 10.

In step S107, when a slide operation is detected in the state where the tag display mode is set, the input unit 11 calculates a trajectory of two-dimensional coordinates by the slide operation and outputs it to the input direction determining unit 13. In step S108, the input direction determining unit 13 determines an order and direction of the slide operation by the user based on the two-dimensional coordinates output from the input 11. The determination of slide operation pattern is carried out by comparing the trajectory of two-dimensional coordinates by the slide operation with coordinate values indicative of the movable direction determination parts D1 to D4, and determining which part the trajectory of two-dimensional coordinates by the slide operation passes among the movable direction determination parts D1 to D4.

In step S109, the input direction determining unit 13 selects a tag corresponding to the slide operation pattern based on the determination result of slide operation pattern. For example, the tag selection is carried out by detecting a memory in which plural pieces of information for representing slide operation patterns are respectively associated with tags and they are stored. Then, when a tag is selected, the input direction determining unit 13 reads out a pointer of a button or hyperlink associated with the tag from the map storage 14, and sends it to the selection processor 12.

For example, it is assumed that in a state where a user touches an arbitrary position in the movable direction determination part D2 with his/her thumb as shown in FIG. 8, the user slides his/her thumb from the movable direction determination part D2 to the movable direction determination part D1 as shown in FIG. 7, and then slides it from the movable direction determination part D1 to the movable direction determination part D3. In this case, the input direction determining unit 13 determines that an operation pattern "←↓," is input because the slide operation is first carried out in a left direction and then the slide operation is carried out in a lower direction. Then, the input direction determining unit 13 reads out a pointer "0x0000ABC2" of a button or hyperlink associated with a tag indicative of the slide operation pattern "←↓" stored in the map storage 14, and then outputs the read pointer "0x0000ABC2" to the selection processor 12. As a result, in step S102, the selection processor 12 determines that a hyperlink "HOME" corresponding to the pointer "0x0000ABC2" is selected, a display figure of the corresponding button or hyperlink displayed in the display 10 is changed into a figure for representing a state after the selection.

When a process for outputting the pointer is finished in step S109, the input direction determining unit 13 sends to the input unit 11 a change instruction for the display mode. When receiving the change instruction, the input unit 11 returns the flag of the display mode from the tag display mode to the normal mode.

The information input device according to the present embodiment is provided with the following configuration. Namely, the movable direction determination parts D1 to D4 are set in the input area on the pressure-sensitive sheet, and tag candidates, each which is composed of one arrow or an arrow line in which plural arrows are combined, are defined in each movable direction determination part and stored. Then, when a user carries out an operation for setting the tag display mode by long push, tag candidates defined in a movable direction determination part including the operation position are sequentially read out and arranged as tags in the vicinity of buttons or hyperlinks or on buttons or hyperlinks displayed in the display 10. In this state, when a user carries out a slide operation in each direction of one or more arrows indicated by a tag arranged to a desired button or hyperlink on the display 10, an order and direction of the slide operation are determined based on an order of moveable direction determination parts through which a trajectory of two-dimensional coordinates by the slide operation passes, so as to detect a slide operation pattern. Based on this detection result, a tag corresponding to the slide operation pattern is specified, and a button or hyperlink subject to the selection operation is identified based on a pointer associated with the specified tag.

Therefore, when selecting a desired button or hyperlink, a user carries out a slide operation with his/her finger tip to select the button or hyperlink, with reference to a slide operation pattern indicated by a displayed tag associated with the button or hyperlink. Thus, even if a button or hyperlink is hidden by a finger tip when a display size of the button or hyperlink is small, or a finger tip is hard to reach a desired button or hyperlink when a display area of the display 10 is large, a user can easily and properly select and specify the button or hyperlink, without directly touching an input position corresponding to a display position of the button or hyperlink.

In addition, since the slide operation pattern is detected based on an order of movable direction determination parts where the trajectory of two-dimensional coordinates by the slide operation passes, the slide operation pattern can be easily and properly detected without implementation of a complicated process such as a vector analysis for operation position coordinates.

Further, the information input device according to the present embodiment divides the input area on the pressure-sensitive sheet into four movable direction determination parts D1 to D4 and previously prepares tag candidates indicative of slide operation patterns of operator associated with each movable direction determination part. When a tag display designation operation is carried out, the information input device sequentially reads out tag candidates associated with a movable direction determination part including the operation position, associates them with buttons or hyperlinks and displays them.

For example, as shown in FIG. 7, since the movable direction determination part D1 positions the upper left of the input area, each of slide operation patterns in the movable direction determination part D1 is set such that at least a first arrow direction is either "lower direction" or "right direction" as shown in FIG. 3. Also, as shown in FIG. 7, since the movable direction determination part D2 positions the upper right of the input area, each of slide operation patterns in the movable direction determination part D2 is set such that at least a first arrow direction is either "lower direction" or "left direction" as shown in FIG. 3. As shown in FIG. 7, since the movable direction determination part D3 positions the lower left of the input area, each of slide operation patterns in the movable direction determination part D3 is set such that at least a first arrow direction is either "upper direction" or "right direction" as shown in FIG. 3. As shown in FIG. 7, since the movable direction determination part D4 positions the lower right of the input area, each of slide operation patterns in the movable direction determination part D4 is set such that at least a first arrow direction is either "upper direction" or "left direction" as shown in FIG. 3.

Thereby, depending on an initial operation position by a user in the input area, proper slide operation patterns can be provided to the user using tags. This allows a user to slidably operate his/her finger with a natural attitude without uncomfortably bending his/her finger or shifting a terminal to the other hand.

For example, as shown in FIG. 7, when the movable direction determination part D2 includes an initial position of a user's finger, a first arrow direction in each of slide operation patterns in the movable direction determination part D2 is set to be either "lower direction" or "left direction" as shown in FIG. 3. Subsequently, when the user moves his/her finger in the left direction, a next position of the user's finger moves to the movable direction determination part D1. Because of this, a second arrow direction in a part of the slide operation patterns in the movable direction determination part D2 is set to be either "lower direction" or "right direction". In contrast, when the user moves his/her finger in the lower direction, a next position of the user's finger moves to the movable direction determination part D4. Because of this, a second arrow direction in the remaining slide operation patterns in the movable direction determination part D2 is set to be either "upper direction" or "left direction". Third and subsequent arrow directions in the slide operation patterns in the movable direction determination part D2 is set in a similar manner. Therefore, a user can smoothly carry out a slide operation with reference to these slide operation patterns.

In addition, when an operation for setting the tag display mode is carried out by long push of a user, the information input device according to the present embodiment sets an object area E1 or E2 where a subsequent operation is carried out, depending on the position coordinate, and assigns one or more tags T to only one or more buttons or hyperlinks displayed in the object area E1 or E2.

There is a possibility that when the number of tags displayed becomes too large, visibility for webpage deteriorates and an increase of the number of operations at the time of selecting a button or hyperlink brings deterioration of operability. However, since the number of tags displayed at the same time is limited by setting the object area E1 or E2 where one or more tags are arranged as describe above, good visibility and operability of display information can be maintained.

First Modified Example

Figure 9:
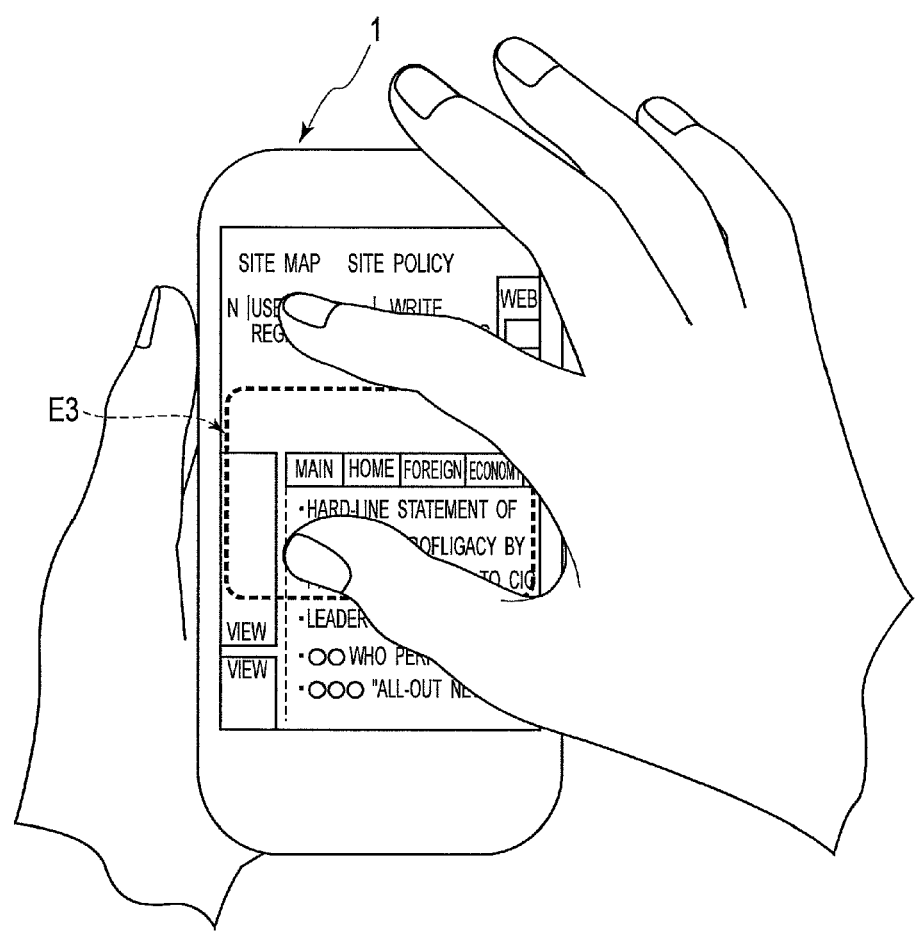

A first modified example of the present embodiment will be described with reference to FIG. 9. In a case where the input unit 11 is provided with a touch panel having a multi-touch function capable of identifying plural touch positions at the same time, the object area determining unit 18 determines an area sandwiched between touch positions of two fingers (area between "y" coordinate values (or "x" coordinate values) of two-dimensional coordinates of two touch positions input into the input unit 11) as an object area. For example, as shown in FIG. 9, an area E3 sandwiched between touch positions of two fingers (area between "y" coordinate values of two-dimensional coordinates of two touch positions) is set as an object area. In this case, since it is projected that a user carries out a slide operation using one finger after specifying the object area E3 using two fingers, the input unit 11 outputs the upper touch position to the movable direction determining unit 17 in order to determine a movable direction.

Second Modified Example

A second modified example of the present embodiment will be described with reference to FIG. 10. In a case where the input unit 11 has a function for detecting a contact area in the input area on the pressure-sensitive sheet being touched by a user's finger tip and sending information regarding the contact area to the object area determining unit 18, the object area determining unit 18 sets as an object area E4 an area which includes one or more buttons or hyperlinks displayed in a direction indicated by a user's finger tip.

Figure 10:
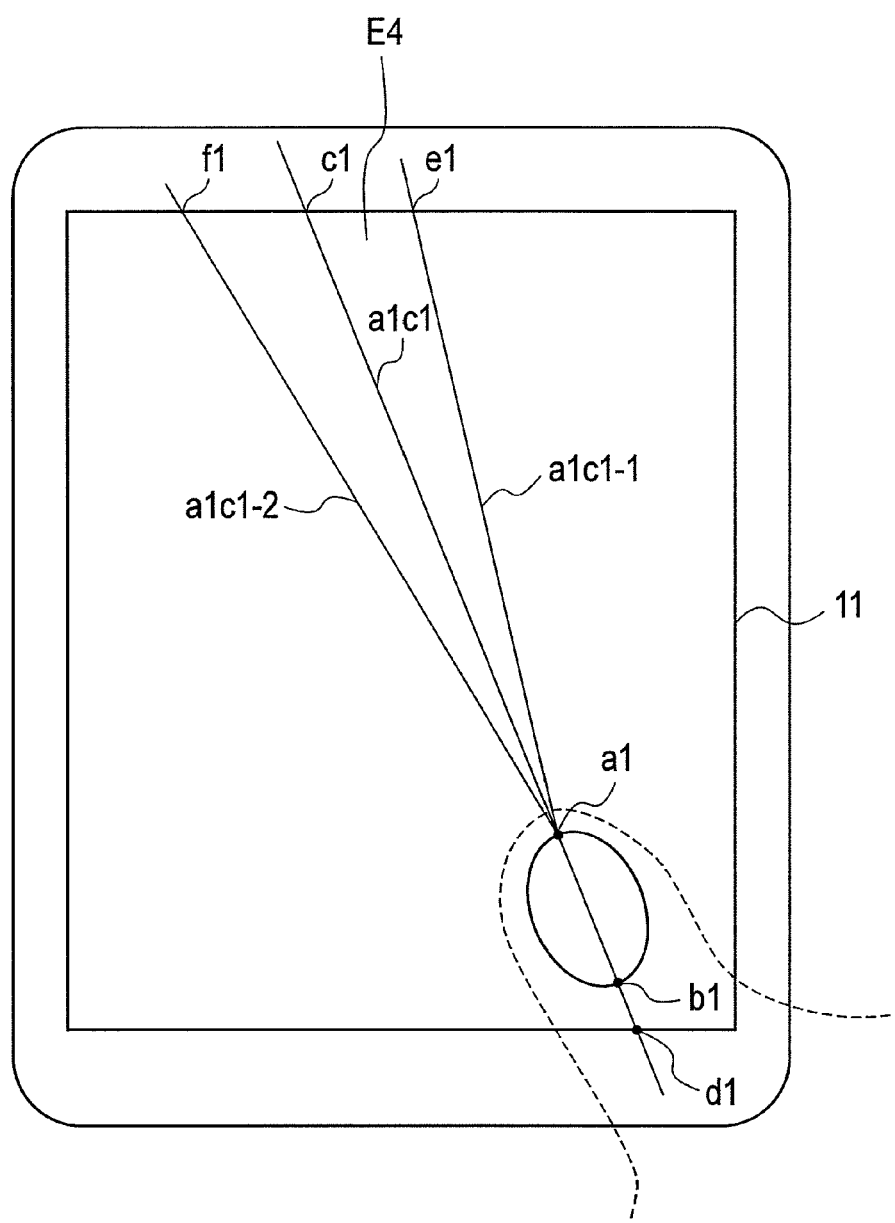

As shown in FIG. 10, the input unit 11 detects as an elliptical area a contact area in the input area on the pressure-sensitive sheet being touched by a user's finger tip. Since it is projected that the user's finger tip faces the long axis direction of the elliptical area, the input unit 11 calculates two points "a1" and "b1" on the border of the elliptical area, between which the distance becomes the largest, and sets a line segment connecting two points "a1" and "b1" as the long axis "a1b1" of the elliptical area. Then, the input unit 11 extends both ends of the long axis "a1b1" and obtains cross-points "c1" and "d1" where the long axis "a1b1" crosses edges of the input area on the pressure-sensitive sheet. Further, the input unit 11 compares the length of vector "a1c1" with the length of vector "b1d1", and sends one vector longer than the other vector as information regarding the contact area to the object area determining unit 18. The object area determining unit 18 sets a direction of the sent vector as a direction indicted by the user's finger tip, and sets an object area E4 along the longer vector such that the area radially widens with increasing distance from the point on the border of the elliptical area.

More specifically, in a case where the vector "a1c1" is longer than the vector "b1d1", the object area determining unit 18 rotates the line segment "a1c1" around the point "a1" on the border of the elliptical area by a certain angle in a clockwise direction and an anticlockwise direction, to generate line segments "a1c1-1" and "a1c1-2". Then, the object area determining unit 18 extends the line segments "a1c1-1" and "a1c1-2" at the side opposite to the point "a1", obtains a cross-point "e1" of the line segment "a1c1-1" and an edge of the display area of the display 10 and a cross-point "f1" of the line segment "a1c1-2" and the edge of the display area of the display 10, and sets an area surrounded by the line segments "a1e1", "a1f1" and "e1f1" as the object area E4.

According to the method for setting an object area according to the present modified example, since the object area determining unit 18 sets as an object area an area which includes one or more buttons or hyperlinks displayed in a direction indicated by a user's finger tip, the user can viscerally set an object area where tags are displayed.

Third Modified Example

A third modified example of the present embodiment will be described with reference to FIG. 11. The input unit 11 detects plural positions (touch positions) in the input area on the pressure-sensitive sheet being touched by user's plural fingers. In a case where the input unit 11 has a function for sending information regarding plural touch positions to the object area determining unit 18, the object area determining unit 18 sets as an object area E5 an area which includes one or more buttons or hyperlinks displayed in a direction indicted by the user's plural finger tips.

As shown in FIG. 11, the input unit 11 detects two touch positions "a2" and "b2" in the input area on the pressure-sensitive sheet being touched by user's two fingers. Since it is projected that the user's two fingers faces a direction in which a line passing the middle point of line segment connecting the touch positions and being perpendicular to the line segment extends, the input unit 11 calculates a line passing the middle point "g2" of the line segment "a2b2" and being perpendicular to the line segment "a2b2", and obtains cross-points "c2" and "d2" where the line crosses edges of the input area on the pressure-sensitive sheet. Then, the input unit 11 compares the length of vector "g2c2" with the length of vector "g2d2", and sends one vector longer than the other vector as information regarding plural touch positions to the object area determining unit 18. The object area determining unit 18 sets a direction of the sent vector as a direction indicted by the user's two fingers, and sets an object area E5 along the longer vector such that the area radially widens with increasing distance from the middle point "g2" of the line segment "a2b2".

More specifically, in a case where the vector "g2c2" is longer than the vector "g2d2", the object area determining unit 18 rotates the line segment "g2c2" around the middle point "g2" of the line segment "a2b2" by a certain angle in a clockwise direction and an anticlockwise direction, to generate line segments "g2c2-1" and "g2c2-2". Then, the object area determining unit 18 extends the line segments "g2c2-1" and "g2c2-2" at the side opposite to the point "g2", obtains a cross-point "e2" of the line segment "g2c2-1" and the edge of the display area of the display 10 and a cross-point "f2" of the line segment "g2c2-2" and the edge of the display area of the display 10, and sets an area surrounded by the line segments "g2e2", "g2f2" and "e2f2" as the object area E5.

According to the method for setting an object area according to the present modified example, since the object area determining unit 18 sets as an object area an area which includes one or more buttons or hyperlinks displayed in a direction indicated by a user's plural finger tips, the user can viscerally set an object area where tags are displayed.

Fourth Modified Example

A fourth modified example of the present embodiment will be described with reference to FIG. 12. The movable direction determining unit 17 dynamically generates each tag candidate composed of one arrow or an arrow line in which plural arrows are combined. In a case where a generated tag candidate, which includes an arrow indicative of a direction in which a slide operation can not be carried out, is canceled, the movable direction determining unit 17 directly sends to the tag arranging unit 15 not a movable direction determination part including a two-dimensional coordinate of the touch position, but instead each generated tag candidate. In this case, the tag candidate storage 16 is omitted.

More specifically, as shown in FIG. 12, in step S200, when a two-dimensional coordinate of the touch position is sent from the input unit 11, the movable direction determining unit 17 defines a variable "i" and assigns a value "0" to the variable "i" to initialize it. In step S201, the movable direction determining unit 17 increments the variable "i". In step S202, the movable direction determining unit 17 converts the variable "i" into quinary number and determines whether or not the converted variable "i" has a digit in which the value "0" is included. If the converted variable "i" has a digit in which the value "0" is included (Yes), the process returns to in step S201. If the converted variable "i" does not have a digit in which the value "0" is included (No), the process proceeds to step S203. Here, when the variable "i" is converted into quinary number, the movable direction determining unit 17 carries out the process of step S202 with respect to the variable "i" incremented in order of "0", "1", "2", "3", "4", "10", "11", "12", "13", "14", "20", "21" . . . . At this time, if a value of the variable "i" has a digit in which the value "0" is included (e.g., "0", "10" or "20"), the process returns to step S201. In step S203, the movable direction determining unit 17 respectively converts into arrows "←", "↑", "→" and "↓" numbers "1", "2", "3" and "4" to be included in the variable "i" converted into quinary number, to dynamically generate a tag candidate. For example, numbers "11" and "32" are respectively converted into tag candidates "←←" and "→↑".

In step S204, the movable direction determining unit 17 sequentially adds or subtracts a certain pixel value (e.g., 100) with respect to an "x" coordinate value in the two-dimension coordinate of the touch position and adds or subtracts a certain pixel value (e.g., 100) with respect to a "y" coordinate value in the two-dimension coordinate of the touch position, with reference to an arrow direction of each generated tag candidate. For example, the movable direction determining unit 17 assumes an "x" coordinate value in the two-dimension coordinate of the touch position as a starting point, and continues to carry out calculation along an arrow direction of each generated tag candidate such as the addition of value "0" if the arrow points to the upper or lower direction, the addition of value "100" if the arrow points to the right direction, or the subtraction of value "100" if the arrow points to the left direction. As well, the movable direction determining unit 17 assumes a "y" coordinate value in the two-dimension coordinate of the touch position as a starting point, and continues to carry out calculation along an arrow direction of each generated tag candidate such as the addition of value "0" if the arrow points to the left or right direction, the addition of value "100" if the arrow points to the upper direction, or the subtraction of value "100" if the arrow points to the lower direction. In step S205, the movable direction determining unit 17 determines whether or not there are/is an "x" coordinate value and/or a "y" coordinate value out of the input area on the pressure-sensitive sheet in the calculation process of step S204. If there are/is an "x" coordinate value and/or a "y" coordinate value out of the input area on the pressure-sensitive sheet (Yes), the process returns to step S201. If there are/is not an "x" coordinate value and/or a "y" coordinate value out of the input area on the pressure-sensitive sheet (No), the process proceeds to step S206. In step S206, the movable direction determining unit 17 sends to the tag arranging unit 15 each tag candidate associated with the variable "i" converted into quinary number. In step S207, the tag arranging unit 15 carries out the process for arranging as a tag a sent tag candidate in the vicinity of a button or hyperlink or on a button or hyperlink displayed in the object area set by the object area determining unit 18. In step S208, the tag arranging unit 15 determines whether or not tags are arranged to all buttons or hyperlinks displayed in the object area. If tags are arranged to all buttons or hyperlinks (Yes), the process is finished. If tags are not arrange to all buttons or hyperlinks (No), the process returns to the step S201. When a user separates his/her finger from the input area on the pressure-sensitive sheet and then touches a different position in the input area on the pressure-sensitive sheet, the movable direction determining unit 17 and the tag arranging unit 15 carry out the processes of steps S200 to S208 to dynamically arrange tags again.

It is noted that after generating plural tag candidates, the movable direction determining unit 17 may collectively cancel tag candidates which includes arrows indicative of directions in which a slide operation can not be carried out, from among the plural tag candidates.

Fifth Modified Example

A fifth modified example of the present embodiment will be described. The input direction determining unit 13 detects change of a two-dimensional coordinate of a slide operation position and determines a slide operation pattern.

For example, the input direction determining unit 13 detects a two-dimensional coordinate of a touch position in the input area on the pressure-sensitive sheet touched by a user's finger at an extremely short time interval (e.g., 0.1 second), and calculates a difference (difference in a lateral direction) between an "x" coordinate value of a current touch position and an "x" coordinate value of a last touch position and a difference (difference in a longitudinal direction) between a "y" coordinate value of the current touch position and a "y" coordinate value of the last touch position. Next, the input direction determining unit 13 calculates absolute values of the differences in the lateral direction and the longitudinal direction, and compares the absolute value of the difference in the lateral direction with the absolute value of the difference in the longitudinal direction. The input direction determining unit 13 identifies a direction which has a larger absolute value of difference as a direction in which a slide operation is carried out, based on the comparison result. It is noted that the input direction determining unit 13 identifies that a slide operation in a left direction or a right direction is carried out based on a positive or negative value of difference in the lateral direction, and identifies that a slide operation in an upper direction or a lower direction is carried out based on a positive or negative value of difference in the longitudinal direction. If the present modified example is combined with the fourth modified example, there is no need to previously set movable direction determination parts with respect to the input area on the pressure-sensitive sheet.

Sixth Modified Example

A sixth modified example of the present embodiment will be described. The input unit 11 sends two-dimensional coordinates of different touch positions to the movable direction determining unit 17 and the object area determining unit 18. In this case, at first, in order to set an object area where tags are displayed in a desired area of the display 10, a user long pushes a first position in the input area on the pressure-sensitive sheet corresponding to a display area where the desired area is included and a button or hyperlink is not displayed. The input unit 11 sends to the object area determining unit 18 a two-dimensional coordinate of the first position (touch position) as a two-dimensional coordinate for determining an object area where tags are displayed. The object area determining unit 18 sets and fixes an object area based on the two-dimensional coordinate of the sent touch position. Next, in order to set a movable direction determination part, a user long pushes a second position in the input area on the pressure-sensitive sheet where a slide operation can be carried out using his/her finger with a natural attitude. The input unit 11 sends to the movable direction determining unit 17 a two-dimensional coordinate of the second position (touch position) as a two-dimensional coordinate for determining a movable direction determination part. The movable direction determining unit 17 sets a movable direction determination part based on the two-dimensional coordinate of touch position sent.

Other Modified Example

In the above-described embodiment, when one button or hyperlink is selected in the tag display mode, the tag display mode is returned to the normal mode. However, a user may hold the tag display mode until carrying out a return operation, and continuously select plural buttons or hyperlinks.

In the above-described embodiment, the input area is divided in four movable direction determination areas D1 to D4 around the center coordinate thereof. However, the manner of division is not limited to it, and if a slide operation direction for a determination object is only "left-right" direction or "upper-lower" direction, the input area may be divided in "left-right" or "upper-lower" to set two movable direction determination areas. Alternatively, the division number may be further increased to set fix more than movable direction determination parts. Thus, when the division number is increased to six more than, a slide operation direction in an "oblique" direction and/or the length of slide operation can be identified in addition to "upper-lower" direction or "left-right" direction.

In the above-described embodiment, although the movable direction determination parts are previously set with respect to the input area on the pressure-sensitive sheet, a user may arbitrarily change the number of movable direction determination parts and the size of each movable direction determination part.

In the above-described embodiment, although each tag is composed of one arrow or an arrow line in which plural arrows are combined, it may be composed of one figure such as ○ (round), Δ (triangle) □ (square) or a figure line in which plural figures are combined.

REFERENCE SIGNS LIST

1 mobile phone
10 display
11 input unit
12 selection processor
13 input direction determining unit
14 map storage
15 tag arranging unit
16 tag candidate storage
17 movable direction determining unit
18 object area determining unit
E1, E2, E3, E4, E5 object areas
D1 to D4 movable direction determination parts

The invention claimed is:
1. An information input device comprising:
a display panel that has a display area where plural selection operation objects are displayed;
a touch panel that has an input area corresponding to the display area, wherein the input area is divided into plural division parts;
a tag display unit configured to receive information representing an input from an operator, wherein the input is associated with a first operation position on the input area and the input initiates a tag display designation operation, to identify a set of candidate slide operation patterns based on which division part includes the first operation position, and to display a tag for each of the selection operation objects, wherein each tag corresponds to one of the selection operation objects and identifies one of the candidates from the set of candidate slide operation patterns and each tag is displayed in a vicinity of the corresponding selection operation object or on the corresponding selection operation object;

wherein the tag display unit is further configured to identify a different set of candidate slide operation patterns when the operator inputs a different operation position in a different division part;

a determining unit configured to detect, based on information representing a second operation position on the input area input by the operator, a slide operation pattern of the operator, and determine whether or not the detected slide operation pattern matches one of the candidates from the set of candidate slide operation patterns; and an identifying unit configured to identify, when the detected slide operation pattern matches one of the candidates from the set of candidate slide operation patterns, that the selection operation object associated with the matched candidate for the slide operation pattern is selected.

2. The information input device according to claim 1, wherein each of the candidates from the set of candidate slide operation patterns indicated by the tags is composed of information indicating a direction in which the operator can continuously move on two or more division parts.

3. The information input device according to claim 1, further comprising:

a setting unit configured to set on the display area, based on receiving an input associated with a third operation position from the operator on the input area, an object area where the tags are to be displayed, wherein the tag display unit displays only the tags associated with the selection operation objects displayed within the object area.

4. The information input device according to claim 3, wherein the setting unit sets as the object area an area that includes a portion of the division part that includes the third operation position and an abutting division part, wherein the portion of the division part that includes the third operation position and the abutting division part share a boundary.

5. The information input device according to claim 1, further comprising:

a setting unit configured to set on the display area, based on receiving an input associated with plural operation positions from the operator on the input area, an object area where the tags are to be displayed, wherein the tag display unit displays only the tags associated with the selection operation objects displayed within the object area.

6. The information input device according to claim 5, wherein the setting unit sets as the object area an area between the plural operation positions.

7. The information input device according to claim 1, further comprising:

a setting unit configured to obtain two points at which a border of a substantially ellipsoidal contact area by the operator in the input area where an object area designation operation by the operator is carried out crosses a long axis of the contact area, extend a line connecting the two points at a side of one point of the two points, rotate the extended line around the one point of the two points by a certain angle in a clockwise direction and an anticlockwise direction, and set an area which is sandwiched between two rotated lines, on the display area as an object area where the tag is to be displayed, wherein the tag display unit displays only the tags associated with the selection operation objects displayed within the object area.

8. The information input device according to claim 1, further comprising:

a setting unit configured to obtain a middle point of a line connecting two selection positions by the operator on the input area where an object area designation operation by the operator is carried out, extend at one side with respect to the line a line intersecting with the line at a certain angle and passing on the middle point, rotate the extended line around the middle point by a certain angle in a clockwise direction and an anticlockwise direction, and set an area which is sandwiched between two rotated lines, on the display area as an object area where the tag is to be displayed, wherein the tag display unit displays only the tags associated with the selection operation objects displayed within the object area.

9. An information input device comprising:

a display panel that has a display area where plural selection operation objects are displayed, a touch panel that-has an input area corresponding to the display area, wherein the input area is divided into plural division parts;

a setting unit configured to set on the display area, based on receiving an input from an operator associated with any one of a fourth operation position, plural operation positions, a contact area by the operator, and two operation positions by the operator on the input area, an object area including the selection operation objects;

a tag display unit configured to identify a set of candidate slide operation patterns based on which division part includes the input from the operator and to display a tag for each of the selection operation objects in the object area, wherein each tag corresponds to one of the selection operation objects and identifies one of the candidates from the set of candidate slide operation patterns and each tag is displayed in a vicinity of the corresponding selection operation object or on the corresponding selection operation object, wherein the tag display unit is further configured to identify a different set of candidate slide operation patterns when the input from the operator is associated with a different division part;

a determining unit configured to detect, based on information representing a fifth operation position on the input area input by the operator, a slide operation pattern of the operator, and determine whether or not the detected slide operation pattern matches one of the candidates from the set of candidate slide operation patterns; and an identifying unit configured to identify, when the detected slide operation pattern matches one of the candidates from the set of candidate slide operation patterns, that the selection operation object associated with the matched candidate for the slide operation pattern is selected.

10. The information input device according to claim 9, wherein the setting unit sets as the object area an area that includes a portion of the division part that includes the fourth operation position and an abutting division part, wherein the portion of the division part that includes the fourth operation position and the abutting division part share a boundary.

11. The information input device according to claim 9, wherein the setting unit sets as the object area an area that includes the plural operation positions.

12. The information input device according to claim 9, wherein the contact area is substantially ellipsoidal, and wherein the setting unit obtains two points at which a border of the substantially ellipsoidal contact area crosses a long axis of the contact area, extend a line connecting the two points at a side of one point of the two points, rotate the extended line around the one point of the two points by a certain angle in a clockwise direction and an anticlockwise direction, and set an area which is sandwiched between two rotated lines, on the display area as the object area.

13. The information input device according to claim 9, wherein the setting unit obtains a middle point of a line connecting the two operation positions received from the operator, extend at one side with respect to the line a line intersecting with the line at a certain angle and passing on the middle point, rotate the extended line around the middle point by a certain angle in a clockwise direction and an anticlockwise direction, and set an area which is sandwiched between two rotated lines, on the display area as the object area.

14. The information input device according to claim 9, wherein the tag display unit specifies, based on receiving a sixth operation position on the input area from the operator, a second set of candidate slide operation patterns based on the division part that includes the sixth operation position, and display a tag for each of the selection operation objects in the object area, wherein each tag corresponds to one of the selection operation objects and identifies one of the candidates from the set of candidate slide operation patterns and each tag is displayed in vicinity of the corresponding selection operation object or on the corresponding selection operation object.

15. The information input device according to claim 14, wherein each of the candidates is composed of information indicating a direction in which the operator can continuously move on two or more division parts.

16. An information input method comprising:
specifying, based on receiving information representing an input from an operator, wherein the information is associated with a first operation position on an input area of a touch panel and initiates a tag display designation operation, a division part that includes the first operation position, wherein the input area is divided into plural division parts;
identifying a set of candidate slide operation patterns based on the specified division part, wherein a different set of candidate slide operation patterns is identified when the input from the operator is associated with a different division part;
displaying a tag for a plurality of selection operation objects, wherein each tag corresponds to one of the selection operation objects and identifies one of the candidates from the set of candidate slide operation patterns and each tag is displayed in a vicinity of the corresponding selection operation object displayed on a display area of a display panel or on the corresponding selection operation object;
detecting, based on information representing a second operation position on the input area input by the operator, a slide operation pattern of the operator;
determining whether or not the detected slide operation pattern matches one of the candidates from the set of candidate slide operation patterns; and
identifying, when the detected slide operation pattern matches one of the candidates from the set of candidate slide operation patterns, that the selection operation object associated with the matched candidate for the slide operation pattern is selected.

17. The information input method according to claim 16, wherein each of the candidates from the set of candidate slide operation patterns indicated by the tags is composed of information indicating a direction in which the operator can continuously move on two or more division parts.

18. The information input method according to claim 16, further comprising:
setting on the display area, based on receiving an input associated with a third operation position from the operator on the input area, an object area where the tags are to be displayed; and
displaying only the tags associated with the selection operation objects displayed within the object area.

19. The information input method according to claim 18, further comprising:
setting as the object area an area that includes a portion of the division part that includes the third operation position and an abutting division part, wherein the portion of the division part that includes the third operation position and the abutting division part share a boundary.

20. The information input method according to claim 16, further comprising:
setting on the display area, based on receiving an input associated with plural operation positions from the operator on the input area, an object area where the tags are to be displayed; and
displaying only the tags associated with the selection operation objects displayed within the object area.

21. The information input method according to claim 20, further comprising:
setting as the object area an area between the plural operation positions.

22. The information input method according to claim 16, further comprising:
obtaining two points at which a border of a substantially ellipsoidal contact area by the operator in the input area where an object area designation operation by the operator is carried out crosses a long axis of the contact area,
extending a line connecting the two points at a side of one point of the two points;
rotating the extended line around the one point of the two points by a certain angle in a clockwise direction and an anticlockwise direction;
setting an area which is sandwiched between two rotated lines, on the display area as an object area where the tag is to be displayed; and
displaying only the tags associated with the selection operation objects displayed within the object area.

23. The information input method according to claim 16, further comprising:
obtaining a middle point of a line connecting two selection positions by the operator on the input area where an object area designation operation by the operator is carried out;
extending at one side with respect to the line a line intersecting with the line at a certain angle and passing on the middle point;
rotating the extended line around the middle point by a certain angle in a clockwise direction and an anticlockwise direction;
setting an area which is sandwiched between two rotated lines, on the display area as an object area where the tag is to be displayed; and
displaying only the tags associated with the selection operation objects displayed within the object area.

24. An information input method comprising:
setting on a display area of a display panel, based on receiving an input from an operator associated with any one of a fourth operation position, plural operation positions, a contact area by an operator, and two operation positions by the operator on an input area of a touch panel, an object area including a plurality of selection operation objects displayed on the display area;

identifying a set of candidate slide operation patterns based on which division part includes the input from the operator, wherein the input area is divided into plural division parts and a different set of candidate slide operation patterns is identified when the input from the operator is associated with a different division part;

displaying a tag for each of the selection operation objects, wherein each tag corresponds to one of the selection operation objects and identifies one of the candidates from the set of candidate slide operation patterns and each tag is displayed in a vicinity of the corresponding selection operation object or on the corresponding selection operation object, detecting, based on information representing a fifth operation position on the input area input by the operator, a slide operation pattern of the operator;

determining whether or not the detected slide operation pattern matches one of the candidates from the set of candidate slide operation patterns; and identifying, when the detected slide operation pattern matches one of the candidates from the set of candidate slide operation patterns, that the selection operation object associated with the matched candidate for the slide operation pattern is selected.

25. The information input method according to claim 24, further comprising:

setting as the object area an area that includes a portion of the division part that includes the fourth operation position and an abutting division part, wherein the portion of the division part that includes the fourth operation position and the abutting division part share a boundary.

26. The information input method according to claim 24, further comprising:

setting as the object area an area that includes the plural operation positions.

27. The information input method according to claim 24, wherein the contact area is substantially ellipsoidal, further comprising:

obtaining two points at which a border of the substantially ellipsoidal contact area crosses a long axis of the contact area;

extending a line connecting the two points at a side of one point of the two points;

rotating the extended line around the one point of the two points by a certain angle in a clockwise direction and an anticlockwise direction; and setting an area which is sandwiched between two rotated lines, on the display area as the object area.

28. The information input method according to claim 24, further comprising:

obtaining a middle point of a line connecting the two operation positions received from the operator;

extending at one side with respect to the line a line intersecting with the line at a certain angle and passing on the middle point;

rotating the extended line around the middle point by a certain angle in a clockwise direction and an anticlockwise direction; and setting an area which is sandwiched between two rotated lines, on the display area as the object area.

29. The information input method according to claim 24, further comprising:

specifying, based on receiving a sixth operation position on the input area from the operator, a second set of candidate slide operation patterns based on the division part that includes the sixth operation position; and displaying a tag for each of the selection operation objects in the object area, wherein each tag corresponds to one of the selection operation objects and identifies one of the candidates from the set of candidate slide operation patterns and each tag is displayed in a vicinity of the corresponding selection operation object or on the corresponding selection operation object.

30. The information input method according to claim 29, wherein each of the candidates is composed of information indicating a direction in which the operator can continuously move on two or more division parts.

31. A non-transitory computer-readable medium having stored thereon an information input program comprising:

a first information input program code for causing a computer to specify, based on receiving information representing an input from an operator, wherein the input is associated with a first operation position on an input area of a touch panel, a division part that includes the first operation position, wherein the input area is divided into plural division parts;

a second information input program code for causing the computer to identify a set of candidate slide operation patterns based on the specified division part and to display a tag for a plurality of selection operation objects, wherein each tag corresponds to one of the selection operation objects and identifies one of the candidates from the set of candidate slide operation patterns and each tag is displayed in a vicinity of the corresponding selection operation object displayed on a display area of a display panel or on the corresponding selection operation object, wherein a different set of candidate slide operation patterns are identified when the input from the operator is associated with a different operation position in a different division part;

a third information input program code for causing the computer to detect, based on information representing a second operation position on the input area input by the operator, a slide operation pattern of the operator;

a fourth information input program code for causing the computer to determine whether or not the detected slide operation pattern matches one of the candidates from the set of candidate slide operation patterns; and a fifth information input program code for causing the computer to identify, when the detected slide operation pattern matches one of the candidates from the set of candidate slide operation patterns, that the selection operation object associated with the matched candidate for the slide operation pattern is selected.

32. A non-transitory computer-readable medium having stored thereon an information input program comprising:

a first information input program code for causing a computer to set on a display area of a display panel, based on receiving an input from an operator associated with any one of a fourth operation position, plural operation positions, a contact area by an operator, and two operation positions by the operator on an input area of a touch panel, an object area including a plurality of selection operation objects displayed on the display area;

a second information input program code for causing the computer to identify a set of candidate slide operation patterns based on which division part includes the input from the operator, wherein the input area is divided into plural division parts and a different set of candidate slide operation patterns is identified when the input from the operator is associated with a different division part and to display a tag for each of the selection operation objects, wherein each tag corresponds to one of the selection operation objects and identifies one of the candidates from the set of candidate slide operation patterns and each tag is displayed in a vicinity of the corresponding selection operation object or on the corresponding selection operation object,
a third information input program code for causing the computer to detect, based on information representing a fifth operation position on the input area input by the operator, a slide operation pattern of the operator;
a fourth information input program code for causing the computer to determine whether or not the detected slide operation pattern matches one of the candidates from the set of candidate slide operation patterns; and
a fifth information input program code for causing the computer to identify, when the detected slide operation pattern matches one of the candidates from the set of candidate slide operation patterns, that the selection operation object associated with the matched candidate for the slide operation pattern is selected.

* * * * *